Oct. 10, 1961 C. R. SMITH ET AL 3,003,299
MOWER ATTACHMENT FOR A TRACTOR
Filed Oct. 23, 1959 3 Sheets-Sheet 1
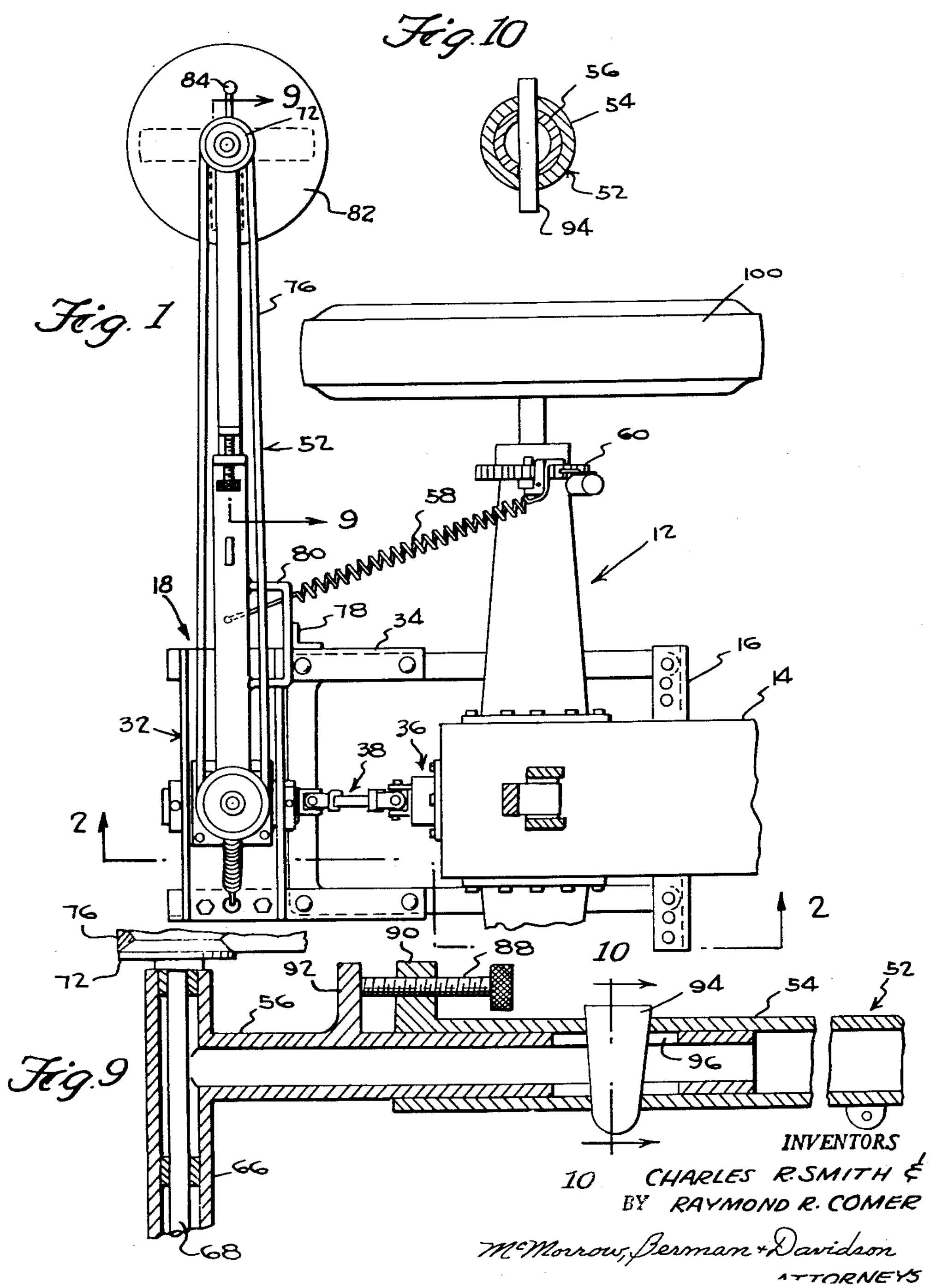

MOWER ATTACHMENT FOR A TRACTOR
Filed Oct. 23, 1959 3 Sheets-Sheet 2
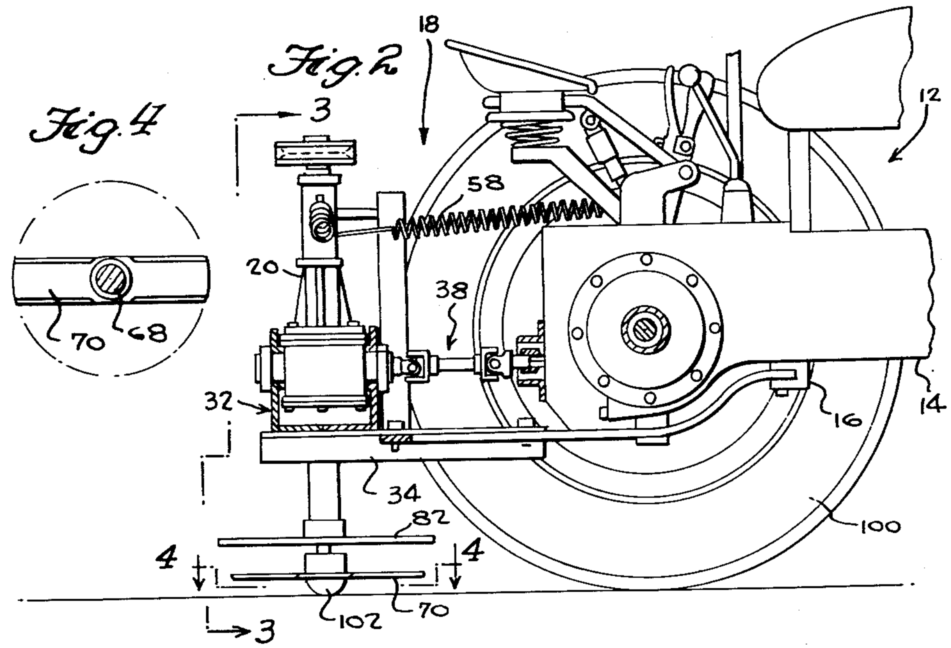
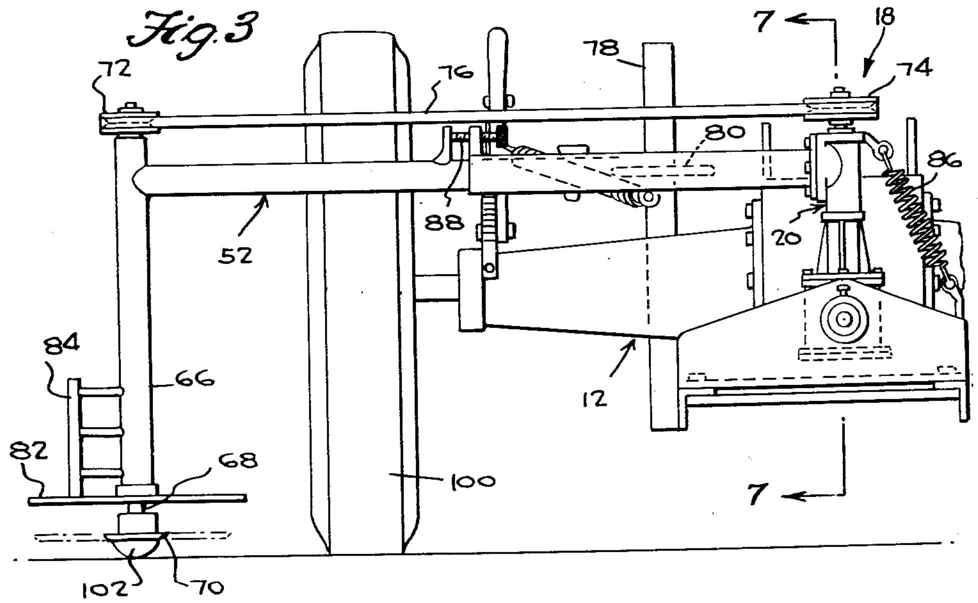
INVENTORS
CHARLES R. SMITH &
BY RAYMOND R. COMER
McMorrow, Berman & Davidson
ATTORNEYS MOWER ATTACHMENT FOR A TRACTOR
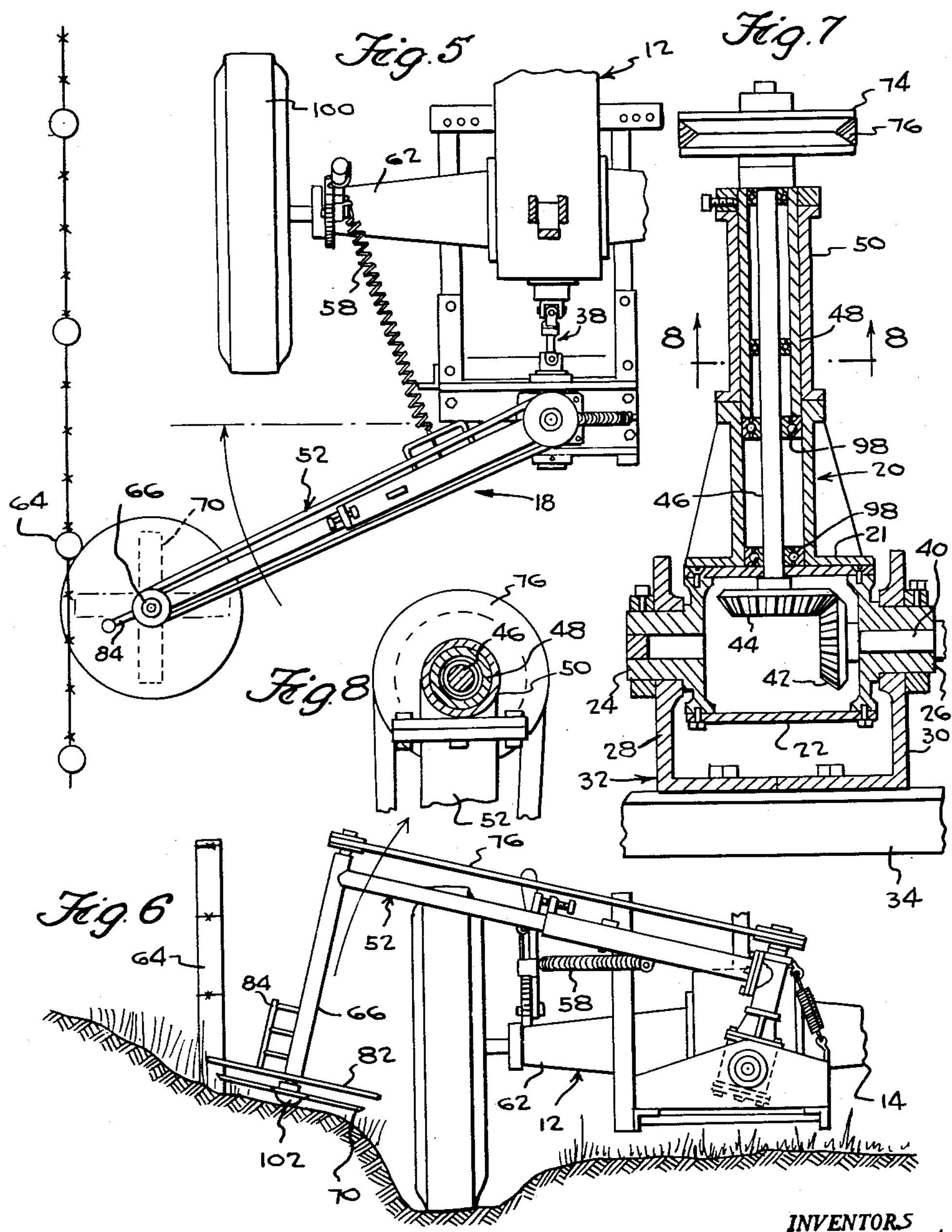
INVENTORS
CHARLES R. SMITH &
BY RAYMOND R. COMER
McMorrow, Berman + Davidson
ATTORNEYS United States Patent Office 3,003,299

Patented Oct. 10, 1961

3,003,299
MOWER ATTACHMENT FOR A TRACTOR

Charles R. Smith, Longview, and Raymond R. Comer, Broadlands, Ill.

Filed Oct. 23, 1959, Ser. No. 848,394
5 Claims. (Cl. 56—25.4)

The present invention relates to mowing machines generally and in particular to a mower attachment for a tractor.

Presently in use are mowing machines and mowing attachments for tractors and the like and generally the devices in use or proposed consist in reciprocating mower bars positioned rearwardly of a tractor or other towing vehicle and projecting from one side thereof. The devices presently in use or proposed are not wholly acceptable for the reason that it is difficult for an operator thereof to maneuver the tractor so as to cut the grass from beneath a fence, close to a row of growing crop, or in and about obstructions along a roadway. Additionally, the mowing machines presently in use or proposed generally have the working implement at a position out of the normal line of sight of the operator of the tractor or other towing vehicle.

An object of the present invention is to provide a mowing attachment for a tractor which is normally within the line of sight of the operator of the tractor, one which is automatic in operation and is designed for cutting grass and weeds from beneath a fence, around obstructions, at a level with the tractor or below or above the level of a tractor.

Another object of the present invention is to provide a mowing attachment for a tractor which is sturdy in construction, one simple in structure requiring no skilled labor for attachment to the tractor, one which uses the power take-off of a tractor for its operation, and one which is economically feasible.

These and other objects and advantages of the present invention will be fully apparent from the following description when taken in conjunction with the annexed drawings, in which:

FIGURE 1 is a fragmentary plan view of the rear end portion of a tractor with the attachment of the present invention installed thereon;

FIGURE 2 is a sectional view taken on the line 2—2 of FIGURE 1;

FIGURE 3 is a sectional view taken on the line 3—3 of FIGURE 2;

FIGURE 4 is a sectional view taken on the line 4—4 of FIGURE 2;

FIGURE 5 is a plan view similar to FIGURE 1, showing the swinging movement of the boom effected by the engagement of the mower blade guard with a fence post;

FIGURE 6 is a fragmentary rear elevational view showing the motor blade working at an elevation above the wheel of the tractor;

FIGURE 7 is a sectional view on an enlarged scale, taken on the line 7—7 of FIGURE 3;

FIGURE 8 is a sectional view taken on the line 8—8 of FIGURE 7;

FIGURE 9 is a sectional view on an enlarged scale, taken on the line 9—9 of FIGURE 1; and FIGURE 10 is a view taken on the line 10—10 of FIGURE 9.

Referring in greater detail to the drawings in which like numerals indicate like parts throughout the several views, the reference numeral 12 designates generally a tractor having a mobile frame 14, the frame 14 including a draw bar 16 to which the attachment of the present invention is secured.

The attachment of the present invention is designated generally by the reference numeral 18 and it comprises a hollow standard 20 positioned adjacent the rearward end of the frame 14 and having the lower end thereof connected to the frame 14 for tilting movement of the standard 20 in a vertical plane transversely disposed with respect to the frame 14.

With particular reference to FIGURES 2 and 7, the standard 20 has its lower end 21 secured to and supported upon one side of a gear box 22 which is provided on its ends with trunnions 24 and 26 rotatably supported in the upright legs 28 and 30, respectively, of a U-shaped support 32 which is bolted to angle iron members 34 projecting rearwardly from and supported upon the draw bar 16.

The tractor 12 has a power take-off coupling 36 rearwardly of the tractor 12 and of conventional construction. The power take-off is driven by the tractor engine, constituting a prime mover. The present invention provides a universal joint coupling 38 having one end connected to the power take-off of the tractor and having the other end connected to a drive shaft 40 (FIGURE 7) supported in the trunnion 26 and having a bevel gear 42 on the free end thereof. The bevel gear 42 is in mesh with another bevel gear 44 on the lower end of a driven shaft 46 rotatably supported within the standard 20.

The upper end of the standard 20 has a reduced portion 48 about which is slidably and rotatably mounted a sleeve 50. A horizontally disposed boom 52 is positioned transversely of the frame 14 adjacent to and spaced from the rearward end of the frame 14 and has one end welded or integrally formed with the sleeve 50 for movement with the sleeve 50 about the standard 20 as an axis.

As shown in FIGURE 9, the boom 52 is composed of two sections 54 and 56 telescopingly arranged together. The sleeve 50 constitutes the means by which the boom 52 is connected to the standard 20 for swinging movement from the transverse position shown in FIGURE 1 to the position rearwardly of and spaced from the rearward end of the tractor 12, as shown in FIGURE 5.

A coil spring 58 has one end attached to the boom 52 intermediate the ends thereof and the other end attached to a bracket 60 which is carried by the axle housing 62 of the tractor 12. The spring 58 urges the boom 52 to the position in which it is transversely of the tractor frame 14, or forwardly of the position it may be in after encountering a fence post, as at 64 in FIGURE 5, and swinging free from such fence post 64.

The end of the boom 52 remote from the standard 20 is formed integrally with or welded to an upright tubular member 66 in which is a vertically disposed rotatable driven shaft 68 having on the lower end thereof a rotary mowing blade 70.

A portion of the shaft 68 projects above the upper end of the tubular member 66 and carries thereon a drive pulley 72. Another pulley 74 is carried upon the upper end projecting portion of the driven shaft 46 and a belt 76 connects the pulleys 72 and 74 together and constitutes a drive means for the shaft 68.

A vertically disposed stop 78, fabricated of angle iron, rises from the one angle iron member 34 on the side of the frame 14 adjacent the tubular member 66 and the associated shaft 68 and blade 70. A U-shaped abutment member 80 has the free ends of its legs welded to the boom section 54 and serves as an abutment to stop 78 to hold the boom 52 in the transverse position shown in FIGURE 1.

Above and spaced from the blade 70 is a blade guard element 82 fixedly secured to the lower end of the tubular member 66 and reinforced by a guard member 84 projecting outwardly from one side of the tubular member 66 and fixedly secured thereto.

A coil spring 86 has one end secured to the upper end of the standard 20 and the other end secured to an adjacent portion of the support 32 and serves as a counterbalance for the boom 52.

With reference to FIGURE 9, means for adjusting the tension of the belt 76 is shown and which consists in a screw 88 threadedly supported in a lug 90 carried on the free end of the boom section 54. The free end of the screw 88 bears against another lug 92 carried by the boom section 56. The boom section 56 is prevented from turning relative to the boom section 54 by means of a wedge element 94 extending through the telescoping portions of the sections 54 and 56 with suitably arranged slots, as at 96, receiving the wedge element 94.

Suitable bearings, as at 98 in FIGURE 7, support the shaft 46 within the standard 20 for free frictionless rotation therein when driven by the power take-off of the tractor 12. The reference numeral 100 designates the wheel of the tractor 12, only one of which is shown for reasons of simplicity.

In use, the blade 70 is rotated at a relatively rapid rate of rotation with the hub 102 of the blade 70 supporting the boom 52 so that the blade 70 is adjacent to and spaced from the ground surface and in a position in which it effectively cuts the weeds and grass from the ground surface, as shown in FIGURE 6. The mounting of the boom 52 on the standard 20 permits the boom 52 to swing from the transverse position to the position rearwardly of the tractor 12, as shown in FIGURE 5, whenever the guard member 84 encounters an obstacle such as the fence post 64. The spring 58 returns the boom 52 to the transverse position after the obstacle has been passed. The mounting of the gear box 22 on the support 32 permits tilting movement of the standard 20 about the drive shaft 40 as an axis so that the boom 52 is enabled to swing upwardly from the horizontal position to an elevated position in a vertical plane which is transversely of the frame 14.

What is claimed is:

1. The combination with a mobile frame, of a mower attachment comprising a standard positioned adjacent one end of said frame and having the lower end thereof connected to said frame for tilting movement of said standard in a vertical plane disposed transversely of said frame, a horizontally disposed boom positioned transversely of said frame adjacent the upper end of said standard and having one end connected to said standard for swinging movement of said boom from the transverse position to a position in which said other end is rearwardly of and spaced from the rearward end of said frame, a vertically disposed driven shaft carried by said other end of said boom, and a horizontally disposed mowing blade on the lower end of said driven shaft.

2. The combination with a mobile frame, of a mower attachment comprising a standard positioned adjacent one end of said frame and having the lower end thereof connected to said frame for tilting movement of said standard in a vertical plane disposed transversely of said frame, a horizontally disposed boom positioned transversely of said frame adjacent the upper end of said standard and having one end connected to said standard for swinging movement of said boom from the transverse position to a position in which said other end is rearwardly of and spaced from the rearward end of said frame, a vertically disposed driven shaft carried by said other end of said boom, a horizontally disposed mowing blade on the lower end of said driven shaft, and spring means operatively connected to said boom urging said boom to the transverse position.

3. The combination with a mobile frame, of a mower attachment comprising a standard positioned adjacent one end of said frame and having the lower end thereof connected to said frame for tilting movement about a vertical plane disposed transversely of said frame, a first driven shaft arranged longitudinally of and rotatably supported in said standard, a horizontally disposed boom positioned transversely of said frame adjacent the upper end of said standard and having one end connected to said standard for swinging movement of said boom from the transverse position to a position in which said other end is rearwardly of and spaced from the rearward end of said frame, a vertically disposed second driven shaft carried by the other end of said boom, drive means drivably connecting said first and second driven shafts together, and a horizontally disposed mowing blade carried by the lower end of said second driven shaft.

4. The combination with a mobile frame having a prime mover thereon, of a mower attachement comprising a standard positioned adjacent one end of said frame and having the lower end thereof connected to said frame for tilting movement about a vertical plane disposed transversely of said frame, a first driven shaft arranged longitudinally of and rotatably supported in said standard, a horizontally disposed boom positioned transversely of said frame adjacent the upper end of said standard and having one end connected to said standard for swinging movement of said boom from the transverse position to a position in which said other end is rearwardly of and spaced from the rearward end of said frame, a vertically disposed second driven shaft carried by the other end of said boom, drive means drivably connecting said first and second driven shafts together, other drive means drivably connecting said first driven shaft to said prime mover, and a horizontally disposed mowing blade carried by the lower end of said second driven shaft.

5. The combination with a mobile frame, of a mower attachment comprising a standard positioned adjacent one end of said frame and having the lower end thereof connected to said frame for tilting movement of said standard in a vertical plane disposed transversely of said frame, a sleeve rotatably mounted on said standard, a horizontally disposed boom positioned transversely of said frame and having one end attached to said sleeve to thereby connect said boom to said standard for swinging movement of said boom from the transverse position to a position in which said other end is rearwardly of and spaced from the rearward end of said frame, a vertically disposed driven shaft carried by said other end of said boom, and a horizontally disposed mowing blade on the lower end of said driven shaft.

References Cited in the file of this patent

UNITED STATES PATENTS

| | | |
|---|---|---|
| 2,580,936 | Lytle | Jan. 1, 1952 |
| 2,770,085 | Laughlin | Nov. 13, 1956 |
| 2,791,081 | Allen et al. | May 7, 1957 |
| 2,791,953 | Erickson et al. | May 14, 1957 |
| 2,815,048 | Davis | Dec. 3, 1957 |
| 2,851,842 | Harp | Sept. 16, 1958 |

FOREIGN PATENTS

| | | |
|---|---|---|
| 937,797 | Germany | Jan. 12, 1956 |